United States Patent
LeBlanc et al.

(10) Patent No.: US 9,617,869 B2
(45) Date of Patent: Apr. 11, 2017

(54) BUMPER FOR SYNCHRONIZING RING OF GAS TURBINE ENGINE

(71) Applicant: United Technologies Corporation, Hartford, CT (US)

(72) Inventors: Ryan Edward LeBlanc, Glastonbury, CT (US); Eugene C. Gasmen, Staten Island, NY (US)

(73) Assignee: United Technologies Corporation, Farmington, CT (US)

( * ) Notice: Subject to any disclaimer, the term of this patent is extended or adjusted under 35 U.S.C. 154(b) by 518 days.

(21) Appl. No.: 14/178,849

(22) Filed: Feb. 12, 2014

(65) Prior Publication Data
US 2014/0234082 A1 Aug. 21, 2014

Related U.S. Application Data

(60) Provisional application No. 61/765,736, filed on Feb. 17, 2013.

(51) Int. Cl.
  F01D 17/16 (2006.01)
  F04D 29/56 (2006.01)
(52) U.S. Cl.
  CPC ......... *F01D 17/162* (2013.01); *F04D 29/563* (2013.01); *F05D 2260/30* (2013.01); *F05D 2300/603* (2013.01); *Y02T 50/672* (2013.01); *Y10T 29/49245* (2015.01)
(58) Field of Classification Search
  CPC ...... F01D 17/14; F01D 17/162; F01D 25/246; F04D 29/563
  See application file for complete search history.

(56) References Cited

U.S. PATENT DOCUMENTS

| | | | | |
|---|---|---|---|---|
| 4,812,106 A | * | 3/1989 | Purgavie | F04D 29/563 |
| | | | | 415/139 |
| 4,925,364 A | * | 5/1990 | Das | F01D 17/162 |
| | | | | 411/183 |
| 5,239,815 A | | 8/1993 | Barcza | |
| 5,308,226 A | | 5/1994 | Venkatasubbu et al. | |
| 5,387,080 A | * | 2/1995 | Bouhennicha | F01D 17/162 |
| | | | | 415/150 |
| 5,593,275 A | | 1/1997 | Venkatasubbu et al. | |
| 6,808,364 B2 | | 10/2004 | O'Reilly et al. | |
| 6,984,105 B2 | | 1/2006 | Clark et al. | |
| 7,198,454 B2 | * | 4/2007 | Evans | F01D 17/162 |
| | | | | 415/12 |
| 7,677,866 B2 | * | 3/2010 | Bromann | F01D 17/162 |
| | | | | 415/160 |
| 7,806,652 B2 | | 10/2010 | Major et al. | |
| 7,934,902 B2 | | 5/2011 | Suciu et al. | |
| 8,240,983 B2 | | 8/2012 | Suljak, Jr. et al. | |
| 2008/0072604 A1 | | 3/2008 | Swanson et al. | |
| 2010/0166543 A1 | | 7/2010 | Carroll | |
| 2012/0195751 A1 | | 8/2012 | Gasmen et al. | |
| 2012/6195755 | | 8/2012 | Gasmen et al. | |

* cited by examiner

*Primary Examiner* — Jacob Cigna
(74) *Attorney, Agent, or Firm* — Carlson, Gaskey & Olds, PC

(57) ABSTRACT

A synchronizing assembly for a gas turbine engine has a synchronizing ring. A bumper assembly has a cradle and a bumper held within the cradle. The cradle is secured to the synchronizing ring by at least one fastener without the fastener extending through the bumper. An engine is also disclosed.

24 Claims, 5 Drawing Sheets

BUMPER FOR SYNCHRONIZING RING OF GAS TURBINE ENGINE

CROSS-REFERENCE TO RELATED APPLICATION

This application claims priority to U.S. Provisional Application No. 61/765,736, filed Feb. 17, 2013.

BACKGROUND

Some gas turbine engines utilize variable stator vanes that are actuated about their rotational axes to improve overall compressor characteristics. A synchronizing assembly is used to accurately control the position of the vanes. One type of synchronizing assembly includes a synchronizing ring that is controlled relative to a compressor case by actuators. Multiple bumpers are circumferentially arranged between the synchronizing ring and a compressor case to facilitate movement of the synchronizing ring throughout the changing clearances.

In one example, shimmed bumpers or runners are used to center the synchronizing ring and provide a wear surface to pads on the compressor case. The bumpers should provide a low friction, wear resistant structure that is inexpensive to manufacture and install.

SUMMARY

In a featured embodiment, a synchronizing assembly for a gas turbine engine has a synchronizing ring. A bumper assembly has a cradle and a bumper held within the cradle. The cradle is secured to the synchronizing ring by at least one fastener without the fastener extending through the bumper.

In another embodiment according to the previous embodiment, the bumper has a solid structure.

In another embodiment according to any of the previous embodiments, the bumper is a composite material.

In another embodiment according to any of the previous embodiments, the cradle is a sheet metal piece.

In another embodiment according to any of the previous embodiments, the cradle includes a base with a center opening surrounded by generally flat side edges. The bumper includes a base portion and a projection portion that extends through the center opening such that the base portion rests on the flat side edges of the cradle.

In another embodiment according to any of the previous embodiments, the bumper projects outwardly beyond an uppermost surface of the cradle and beyond a lowermost surface of the cradle.

In another embodiment according to any of the previous embodiments, the cradle includes a pair of side walls extending upwardly from the base connected by a pair of end walls extending upwardly from the base. The side walls define a length that is greater than a width of the end walls.

In another embodiment according to any of the previous embodiments, a clearance feature is included at each intersection between one side wall and one end wall.

In another embodiment according to any of the previous embodiments, the clearance feature has a recess at each corner of the center opening.

In another embodiment according to any of the previous embodiments, a tab extends from each of the end walls and have an attachment interface for the at least one fastener.

In another embodiment according to any of the previous embodiments, the at least one fastener comprises two fasteners. Each tab includes one opening configured to receive one fastener.

In another featured embodiment, a gas turbine engine has a compressor section including a compressor case with at least one pad. At least one stage of variable stator vanes is associated with the compressor section. A synchronizing assembly actuates the variable stator vanes, and includes a synchronizing ring and a bumper assembly. The bumper assembly has a cradle and a bumper held within the cradle between the at least one pad and the synchronizing ring. The cradle is secured to the synchronizing ring by at least one fastener without the fastener extending through the bumper.

In another embodiment according to the previous embodiment, the bumper comprises a solid structure.

In another embodiment according to any of the previous embodiments, the cradle includes a base with a center opening surrounded by generally flat side edges. The bumper includes a base portion and a projection portion that extends through the center opening such that the base portion rests on the flat side edges of the cradle.

In another embodiment according to any of the previous embodiments, the bumper projects outwardly beyond an uppermost surface of the cradle and beyond a lowermost surface of the cradle.

In another embodiment according to any of the previous embodiments, the cradle includes a pair of side walls extending upwardly from the base connected by a pair of end walls extending upwardly from the base. The side walls define a length that is greater than a width of the end walls.

In another embodiment according to any of the previous embodiments, a clearance feature is included at each intersection between one side wall and one end wall.

In another embodiment according to any of the previous embodiments, a tab extends from each of the end walls. The tabs have a fastener attachment interface. The at least one fastener comprises two fasteners. Each tab includes one opening configured to receive one fastener.

In another featured embodiment, a method of manufacturing a bumper assembly for a gas turbine engine includes the steps of providing a generally flat sheet metal piece, punching a center opening in the sheet metal piece, bending a pair of side walls upwardly around the center opening to form a first pair of generally flat side edges along the center opening. A pair of end walls are bent upwardly around the center opening to form a second pair of generally flat side edges along the center opening. The second pair of generally flat side edges interconnect the first pair of generally flat side edges, and further bend the end walls to form a pair of attachment tabs. A bumper is inserted into the center opening.

In another embodiment according to any of the previous embodiments, there is at least one fastener hole in each attachment tab.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
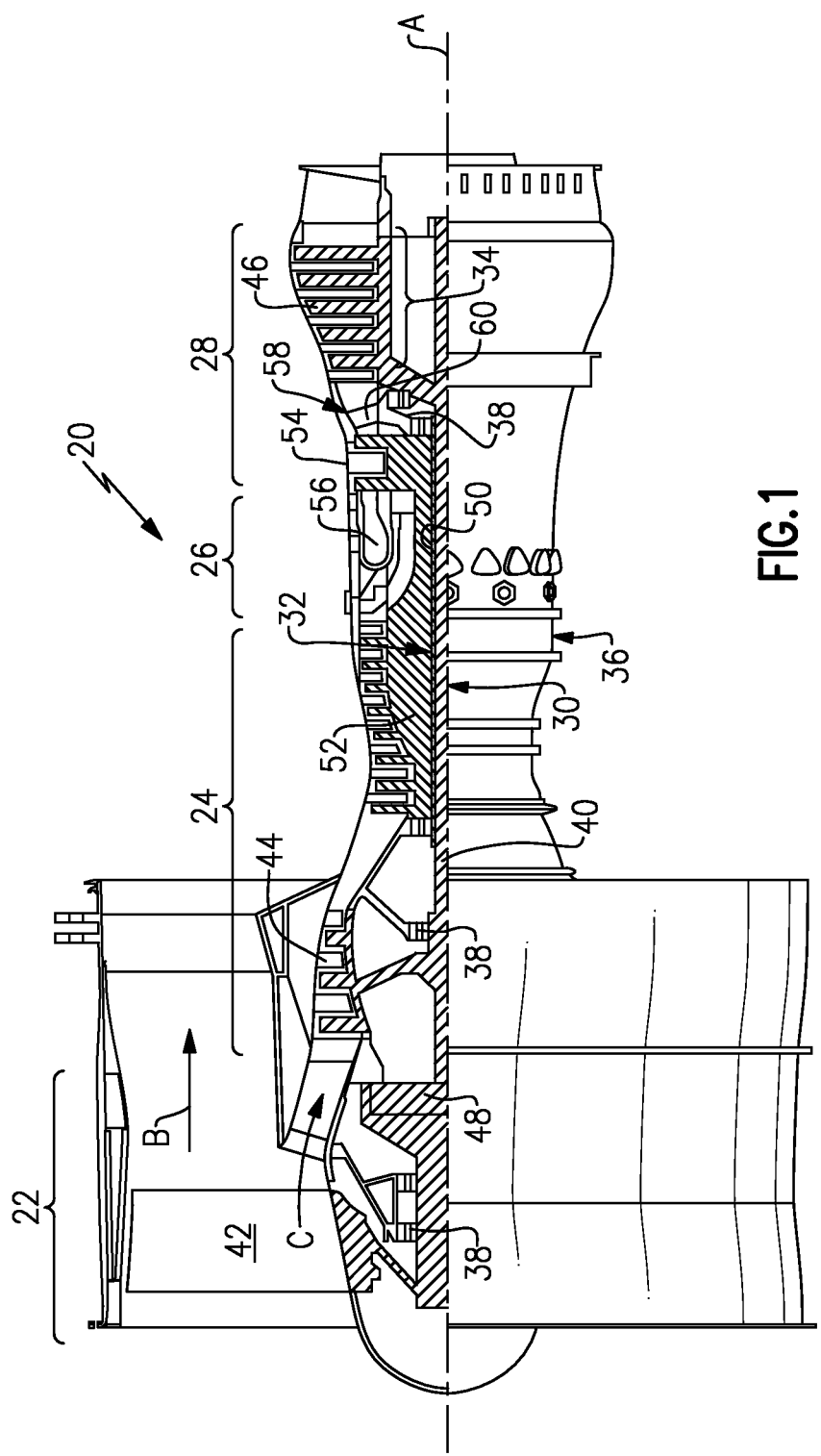
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or second) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or first) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition— typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
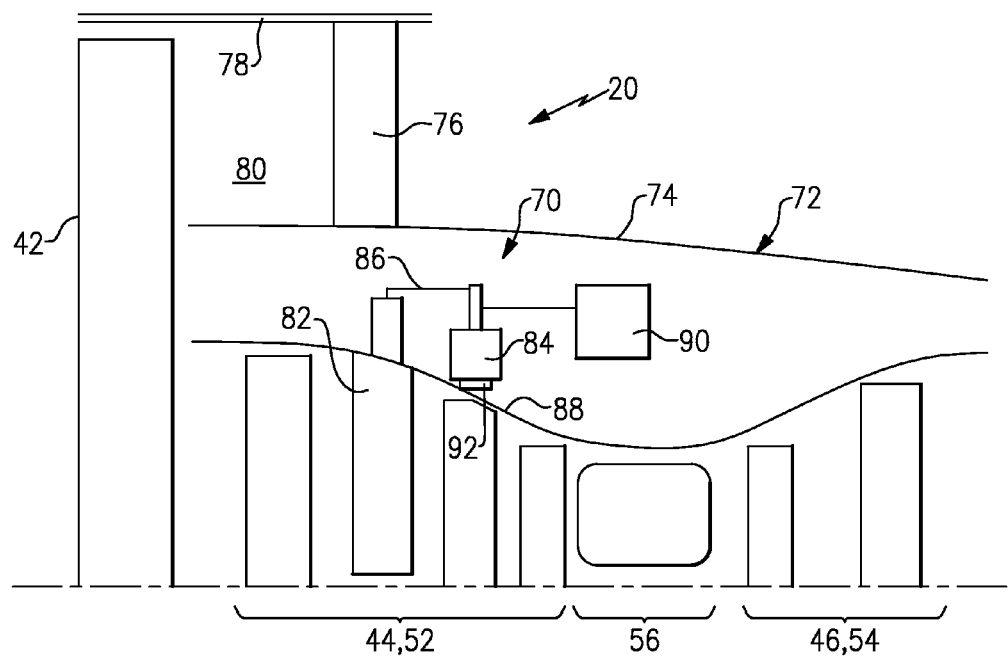
FIG. 2 is a highly schematic view of the example gas turbine engine with a synchronizing assembly.

A schematic representation of a synchronizing assembly 70 for a variable vane structure as used in the gas turbine engine 20 is shown in FIG. 2. The gas turbine engine 20 includes a core 72 having the compressor 44, 52, combustor 56, and turbine sections 46, 54 which are housed within a core nacelle 74. The core 72 is supported relative to a fan case 78 by circumferentially arranged flow exit guide vanes 76. A fan duct 80 is provided between the fan case 78 and the core nacelle 74 and receives airflow from the fan 42.

In the example gas turbine engine 20, the compressor section 44, 52 includes at least one stage of variable stator vanes 82 that are actuated by the synchronizing assembly 70 to rotate the vanes 82 about their respective axes to improve the overall efficiency of the compressor section 44, 52.

Figure 3:
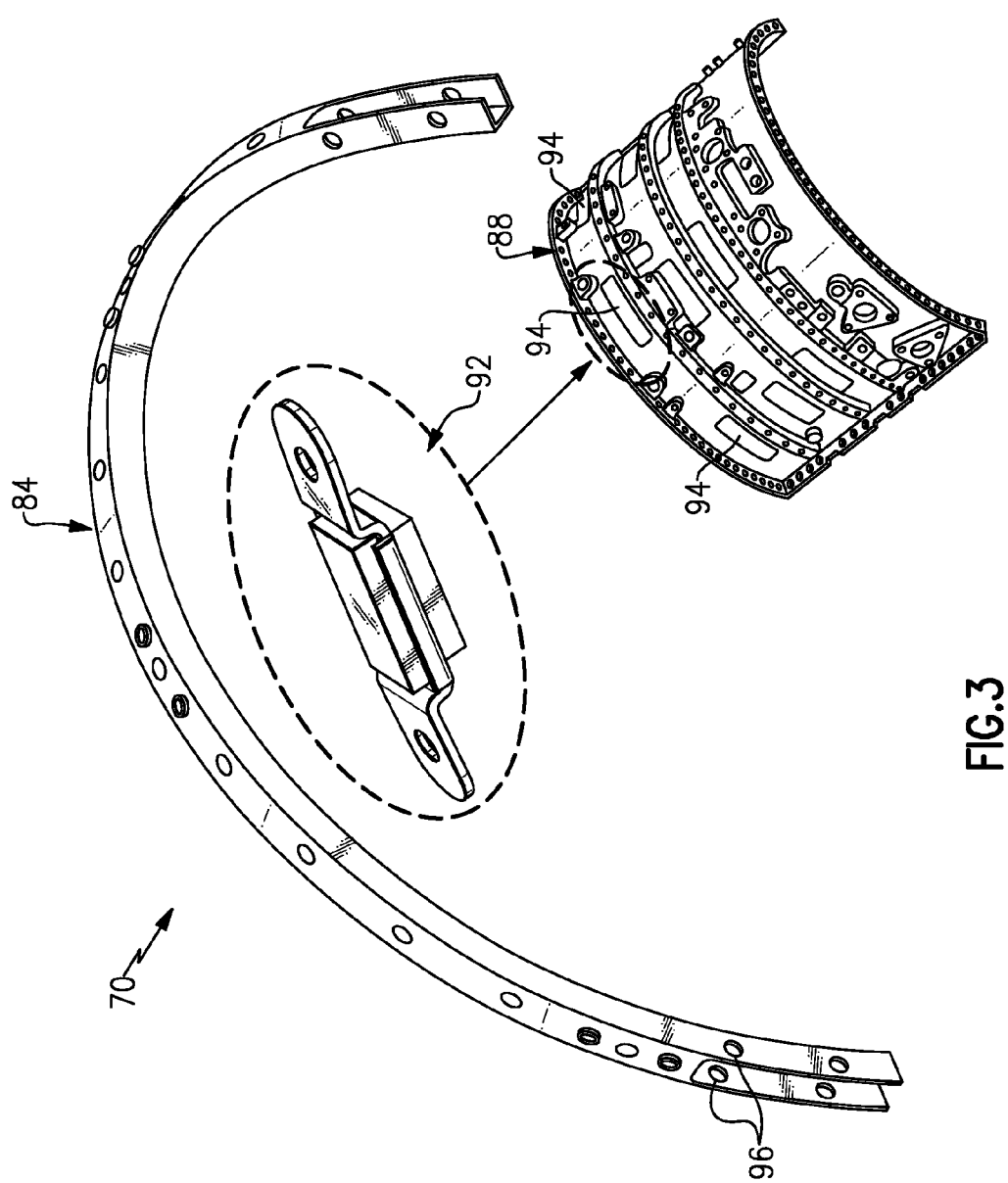
FIG. 3 is an exploded view of a portion of a synchronizing assembly and its corresponding compressor case.

The synchronizing assembly 70 includes a synchronizing ring 84 interconnected to the vanes 82 by arms 86. The synchronizing ring 84 is slidably mounted to a compressor case 88. An actuator 90 moves the synchronizing ring 84 in a generally axial and circumferential direction along an arcuate path to rotate the vanes 82. Bumper assemblies 92 are arranged circumferentially between the synchronizing ring 84 and the compressor case 88. As illustrated in FIG. 3, the bumper assemblies 92 are supported on pads 94 circumferentially arranged on the exterior of the compressor case 88.

The synchronizing ring 84 includes openings 96 (FIG. 3) that provide clevis attachments (not shown) to the actuator mechanism 90. Further, the ring 84 includes openings 98 (FIG. 5) that receive fasteners 100 used to secure the bumper assemblies 92 to the synchronizing ring 84.

Figure 4:
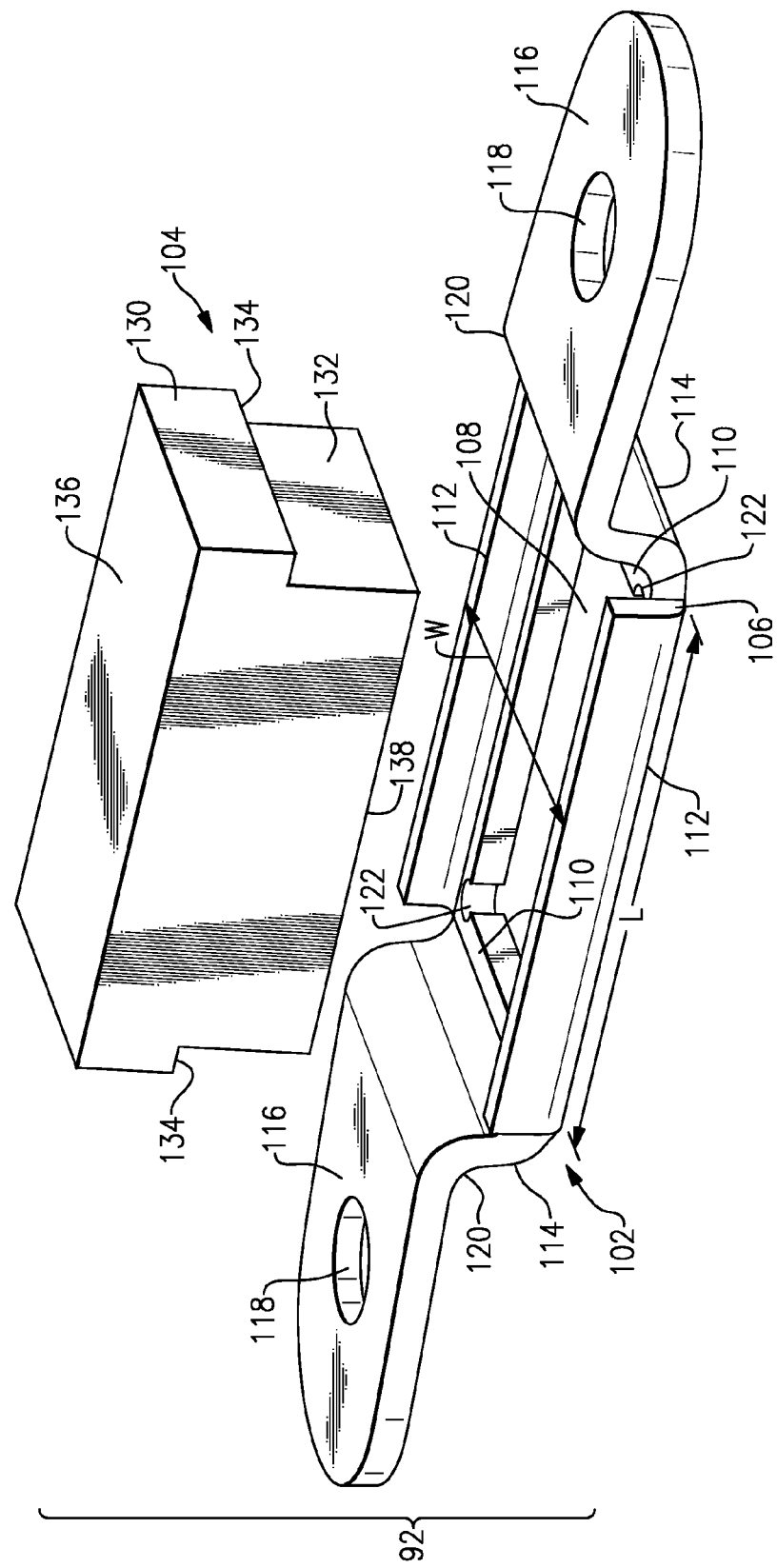
FIG. 4 is an exploded view of a bumper and cradle as used in the synchronizing assembly of FIG. 3.
Figure 5:
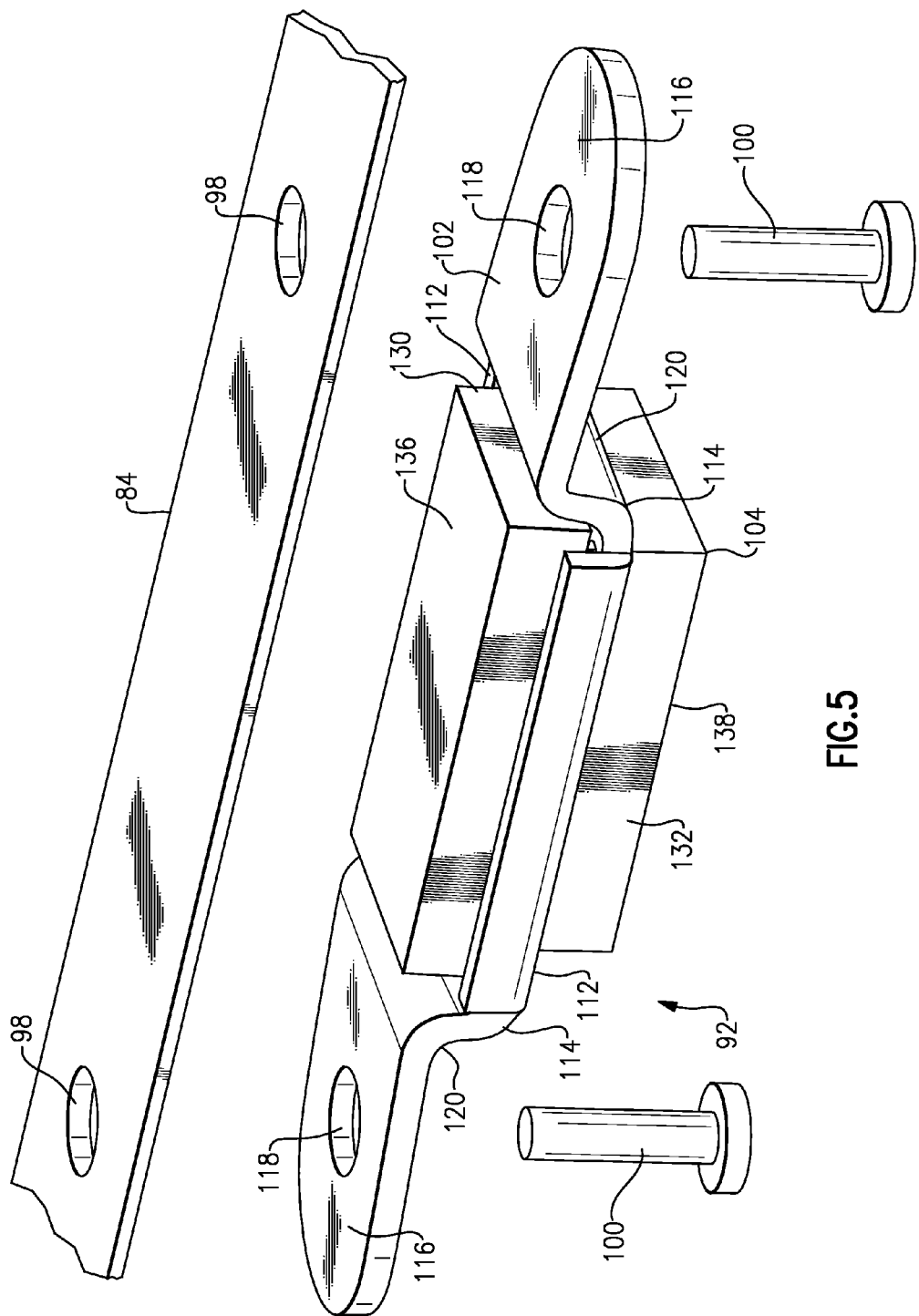
FIG. 5 is a perspective view of the bumper and cradle as assembled.

An example bumper assembly 92 is shown in FIGS. 4-5. The bumper assembly 92 includes a cradle 102 and a bumper 104. The cradle 102 includes a base 106 that defines a center opening 108 that receives the bumper 104. Generally flat edges 110 are formed in the base 106 and surround the center opening 108. The edges 110 are configured to define an overall rectangular shape for a center portion of the cradle 102 that has a length L that is greater than a width W.

A pair of side walls 112 extend upwardly from the set of edges 110 that define the length L. A pair of end walls 114 extend upwardly from the set of edges that define the width W. A pair of elongated tabs 116 extend from the end walls 114 in a direction that corresponds to the length L. Each tab 116 includes at least one opening 118 that is to be aligned with openings 98 in the synchronizing ring 84 such that the cradle 102 can be secured to the ring 84 with fasteners 100. A curved transition portion 120 connects the tabs 116 to the end walls 114. In one example, the curved transition portion 120 and end walls 114, in combination, are configured to define a S-shaped cross-section.

Each corner of the center opening 108 includes a clearance feature 122. The clearance feature 122 is formed at each intersection between adjacent edges 110. In one example, the clearance feature 122 comprises a removed area or open recess between adjacent edges 110. In one example, the open recess is defined by a curved or arcuate surface. The clearance features 122 facilitate stress reduction and provide enhanced flexibility for accommodating movement of the synchronizing ring 84.

As shown in FIG. 4, the bumper 104 includes a base portion 130 and a projection portion 132 extending outwardly from the base portion 130. The base portion 130 is defined by a length and width that are greater than a length and width of the projection portion 132 such that a generally flat lip portion 134 is formed around the projection portion 132. When the bumper 104 is inserted into the cradle 102 as shown in FIG. 5, the projection portion 132 extends through the center opening 108 and the lip portion 134 rests on the edges 110. When installed, the base portion 130 extends outwardly beyond the surface that defines the tabs 116.

In one example, the bumper 104 is formed from a composite material, for example; however other types of materials with low friction and good wear resistant characteristics could also be used. The bumper 104 comprises a solid piece of material that does not include any openings for fastener attachments. Only the cradle 102 is directly fastened to the ring 84 via tabs 116 and fastener openings 118. In other words, the bumper itself is not secured to the ring 84, and instead the bumper 104 is simply trapped by the cradle 102 against the underside of the ring 84.

The tabs 116 are configured to allow for low profile headed fasteners to be used for a strong mechanical attachment to the ring 84. The overall height of the bumper 104 is configured such that it extends beyond both an uppermost surface that defines the tabs 116 and a lowermost surface that defines a bottom of the cradle 102. Thus, there is a bumper surface 136 that abuts against the ring 84 and a bumper surface 138 that abuts against the pad 94 on the compressor case 88. Further, when the fasteners 100 are installed, the heads do not come into contact with the case 88 due to the spacing provide by the projection portion 132 of the bumper 104.

In one example, the cradle 102 is formed from an initially flat sheet metal piece with a rectangular hole punched through the piece to form the rectangular opening 108 and to provide the clearance features 122. The side edges are then bent upwardly to form the side walls 112, which improve stiffness along a center portion of the cradle 102. The end edges are bent upwardly and outwardly to form the end walls 114 and the tabs 116.

One benefit provided by the subject bumper assembly 92 is that the composite material of the bumper 104 is not directly loaded by the preload in the fasteners. Further, this configuration maintains the ability to be shimmed as needed to adjust for tolerances. Additionally, forming the cradle 102 from sheet metal as described above is very inexpensive compared to prior configurations. The subject bumper assembly 92 thus maintains all desired features, e.g., anti-rotation, shimmability, no preloading of the composite material, at a very inexpensive cost. Further, as the bumper itself is not fastened directly to the ring, a composite material with a lower strength but better wear characteristics can be used.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A synchronizing assembly for a gas turbine engine comprising:

a synchronizing ring to be attached to a case structure surrounding an engine axis; and a bumper assembly comprising a cradle and a bumper held within the cradle, wherein the cradle is secured to the synchronizing ring by at least one fastener without the fastener extending through the bumper, and wherein the bumper includes a first surface and a second surface radially inward of the first surface, the first surface abutting against the synchronizing ring and the second surface abutting against the case structure.

2. The synchronizing assembly according to claim 1 wherein the cradle comprises a sheet metal piece.

3. The synchronizing assembly according to claim 1 wherein the bumper comprises a solid structure.

4. The synchronizing assembly according to claim 3 wherein the bumper is comprised of a composite material.

5. The synchronizing assembly according to claim 1 wherein the bumper comprises a base portion and a projection portion that extends radially inward of the base portion toward the engine axis, and wherein the base portion extends circumferentially beyond the projection portion to define a lip portion.

6. The synchronizing assembly according to claim 5 wherein the cradle includes a base with an opening extending through the base and tabs extending circumferentially from opposing ends of the base, wherein the tabs are radially outward of the base, and wherein the opening is surrounded by side edges, and wherein the lip portion rests on the side edges.

7. The synchronizing assembly according to claim 6 wherein the side edges comprise first and second side edges that define a length of the base and first and second end edges that define a width of the base, and including side walls extending radially outwardly from the first and second side edges and end walls extending radially outwardly from the first and second end edges.

8. The synchronizing assembly according to claim 1 wherein the cradle includes a base with a center opening surrounded by generally flat side edges, and wherein the bumper includes a base portion and a projection portion that extends in a radially inward direction from the base portion to form a lip portion that surrounds the projection portion, and wherein the projection portion extends through the center opening such that the lip portion rests on the flat side edges of the cradle.

9. The synchronizing assembly according to claim 8 wherein the bumper projects outwardly beyond a radially outermost surface of the cradle to directly abut against the synchronizing ring and beyond a radially innermost surface of the cradle to directly abut against the case structure.

10. The synchronizing assembly according to claim 8 wherein the cradle includes a pair of side walls extending radially outwardly from the base connected by a pair of end walls extending radially outwardly from the base, the side walls defining a length that is greater than a width of the end walls.

11. The synchronizing assembly according to claim 10 including a clearance feature at each intersection between one side wall and one end wall.

12. The synchronizing assembly according to claim 11 wherein the clearance feature comprises a recess at each corner of the center opening.

13. The synchronizing assembly according to claim 10 including a tab extending from each of the end walls, the tabs comprising an attachment interface for the at least one fastener, and wherein the tabs are located radially outwardly of the base.

14. The synchronizing assembly according to claim 13 wherein the at least one fastener comprises two fasteners, and wherein each tab includes one opening configured to receive one fastener.

15. A gas turbine engine comprising:
a compressor section surrounding an engine center axis and including a compressor case with at least one pad;
at least one stage of variable stator vanes associated with the compressor section; and
a synchronizing assembly that actuates the variable stator vanes, the synchronizing assembly including a synchronizing ring and a bumper assembly, the bumper assembly comprising a cradle and a bumper held within the cradle between the at least one pad and the synchronizing ring, and wherein the cradle is secured to the synchronizing ring by at least one fastener without the fastener extending through the bumper, and wherein the bumper includes a first surface that abuts against the synchronizing ring and a second surface radially inward of the first surface, the second surface abutting against the pad.

16. The gas turbine engine according to claim 15 wherein the bumper comprises a solid structure.

17. The gas turbine engine according to claim 15 wherein the bumper comprises a base portion and a projection portion that extends radially inward of the base portion toward the engine center axis, and wherein the base portion extends circumferentially beyond the projection portion to define a lip portion.

18. The gas turbine engine according to claim 17 wherein the cradle includes a base with an opening extending through the base and tabs extending circumferentially from opposing ends of the base, and wherein the tabs are radially outward of the base, and wherein the opening is surrounded by side edges, and wherein the lip portion rests on the side edges.

19. The gas turbine engine according to claim 18 wherein the side edges comprise first and second side edges that define a length of the base and first and second end edges that define a width of the base, and including side walls extending radially outwardly from the first and second side edges and end walls extending radially outwardly from the first and second end edges.

20. The gas turbine engine according to claim 15 wherein the cradle includes a base with a center opening surrounded by generally flat side edges, and wherein the bumper includes a base portion and a projection portion that extends in a radially inward direction from the base portion to form a lip portion that surrounds the projection portion, and wherein the projection portion extends through the center opening such that the lip portion rests on the flat side edges of the cradle.

21. The gas turbine engine according to claim 20 wherein the bumper projects outwardly beyond a radially outermost surface of the cradle to directly abut against the synchronizing ring and beyond a radially innermost surface of the cradle to directly abut against the compressor case.

22. The gas turbine engine according to claim 21 wherein the cradle includes a pair of side walls extending radially outwardly from the base connected by a pair of end walls extending radially outwardly from the base, the side walls defining a length that is greater than a width of the end walls.

23. The gas turbine engine according to claim 22 including a clearance feature at each intersection between one side wall and one end wall.

24. The gas turbine engine according to claim 22 including a tab extending from each of the end walls, the tabs comprising a fastener attachment interface, and wherein the tabs are located radially outwardly of the base, and wherein the at least one fastener comprises two fasteners, and wherein each tab includes one opening configured to receive one fastener.

* * * * *